(12) United States Patent
Kuhn (10) Patent No.: US 9,174,583 B2
(45) Date of Patent: Nov. 3, 2015

(54) STORAGE CONTAINER FOR MOTOR-VEHICLE INTERIOR

(71) Applicant: Stefan Kuhn, Kastl (DE)

(72) Inventor: Stefan Kuhn, Kastl (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/346,763

(22) PCT Filed: Oct. 10, 2012

(86) PCT No.: PCT/DE2012/000986
§ 371 (c)(1),
(2) Date: Apr. 3, 2014

(87) PCT Pub. No.: WO2013/053348
PCT Pub. Date: Apr. 18, 2013

(65) Prior Publication Data
US 2014/0312084 A1    Oct. 23, 2014

(30) Foreign Application Priority Data
Oct. 10, 2011    (DE) .................. 10 2011 115 373

(51) Int. Cl.
*B60R 7/04*    (2006.01)

(52) U.S. Cl.
CPC ........................ *B60R 7/04* (2013.01)

(58) Field of Classification Search
CPC ......... B60R 7/04; B60N 2/4686; B65D 43/20
USPC .......... 224/539, 281; 220/263, 812, 817, 350; 296/37.8
See application file for complete search history.

(56) References Cited

U.S. PATENT DOCUMENTS

| | | | | |
|---|---|---|---|---|
| 5,065,884 | A  * | 11/1991 | Naritomi et al. | 220/264 |
| 7,740,299 | B2 * | 6/2010 | Reischer et al. | 296/24.34 |
| 8,556,118 | B2 * | 10/2013 | Hamaguchi | 220/830 |
| 8,579,151 | B2 * | 11/2013 | Kodama et al. | 220/812 |

FOREIGN PATENT DOCUMENTS

| | | |
|---|---|---|
| DE | 102006020264 A | 11/2007 |
| DE | 102008018557 A | 10/2009 |
| EP | 1591317 A | 11/2005 |

* cited by examiner

*Primary Examiner* — Brian D Nash
*Assistant Examiner* — Corey Skurdal
(74) *Attorney, Agent, or Firm* — Andrew Wilford (57) ABSTRACT

A container for a vehicle interior has a base body in which at least one compartment is formed and a lid for at least partially closing the compartment and movable between a closed position and an open position. An actuator biases the lid into the open position and a latch can retain it in the closed position. A first brake associated with the actuator retards movement of the lid during movement of the lid from the closed into the opened position. A second brake further retards movement of the lid in only a limited end portion of its movement into the open position.

11 Claims, 7 Drawing Sheets

Fig. 5

STORAGE CONTAINER FOR MOTOR-VEHICLE INTERIOR

CROSS REFERENCE TO RELATED APPLICATIONS

This application is the US-national stage of PCT application PCT/DE2012/000986 filed 10 Oct. 2012 and claiming the priority of German patent application 102011115373.3 itself filed 10 Oct. 2011.

FIELD OF THE INVENTION

The invention relates to a container for vehicle interiors. Such a container is in a center console, for example, and has a compartment with a lid that can to close the compartment.

BACKGROUND OF THE INVENTION

A compartment with a roller shutter lid is described in EP 1 591 317. The roller shutter lid is provided with an elastically deformable spring membrane. The roller shutter lid is guided in guides having a curvature in one limited portion. As a result of the curvature, a force is exerted on the spring membrane of the roller shutter lid in the opening or closing direction.

DE 10 2008 018 557 describes a storage compartment with a roller shutter lid. An elastic element urges the roller shutter lid in the opening direction.

DE 10 2006 020 264 describes a compartment with a lid for the interior of a vehicle. A roller spring biases the lid in the open position.

OBJECT OF THE INVENTION

The object of the invention was to create a compartment with a lid, wherein the lid has an advantageous opening and/or closing behavior with regard to the opening movement.

SUMMARY OF THE INVENTION

The object is achieved by a container that has a base body in which at least one compartment is formed. The compartment is a plastic molded part for example. Further, the container has a lid. The compartment can be at least partially closed by the lid. Objects for example can be safely stowed in the compartment. In the event of an accident, the lid prevents the objects from being thrown out of the compartment and creating a hazard for the occupants of the vehicle. The lid can be moved between a closed position and an open position.

An actuator biases the lid into the open position or into the closed position. The lid can be locked in the open position and/or in the closed position and/or in intermediate positions by a latch. In a locked position of the latch, the lid cannot be moved by the actuator. In an unlocked position of the latch, the lid can be moved by the actuator.

The container has at least one brake that retards movement of the lid in at least one limited portion of the opening movement and/or of the closing movement by a brake. In other words, the opening movement and/or the closing movement of the lid runs with a first characteristic in at least one first region and is with a second characteristic in at least one second region, the second characteristic is characterized in that the movement is braked. The movement of the lid can be braked throughout. In this case, the movement of the lid in the second region is braked with greater force. Within the meaning of the invention, "in at least one limited portion" means that the movement of the lid is braked by a brake in one limited portion or in a plurality of limited portions but not in the whole region of movement.

Within the meaning of the invention, a brake is a device by means of which the movement of the lid can be retarded. For example, the brake can interact with the lid and/or with the actuator. The brake can comprise a so-called viscosity brake for example. The at least one brake can, for example, brake the lid when moving into the open position and/or when moving into the closed position.

This way, it is possible to accord the movement of the lid a certain characteristic. For example, the lid can move into the open position after the latch has been switched to the unlocked position. Shortly before reaching the open position, the movement can be braked by a brake. In this way, the container makes a high-quality impression on the user. In addition, when the lid comes into contact with a stop for example, a noisy contact with the stop can be prevented.

According to an embodiment the actuator has at least one elastic element. The elastic element can bias the lid, for example in the opening direction or in the closing direction when it is elastically deformed. For example, the elastic element is elastically deformed when closing the lid. The lid can then be opened under the action of the restoring force of the elastic element. The elastic element can be formed by a spring, for example.

A further embodiment is characterized in that the actuator has a force-transmitting element. The principal element of the actuator, e.g. an elastic element, does not then have to be connected directly to the lid. The actuator can be provided in a suitable location, e.g. on the bottom of the base body or, for example, remote from the container. The force-transmitting element can comprise a linkage or a pull cable, for example, which is connected between the lid and the actuator.

A pull cable has the advantage that it can be flexibly redirected for example. In addition, it saves space and can be wound onto a storage device. The storage device can be formed by a wheel or a shaft, for example, on which the pull cable can be wound.

For example, a biasing element, in particular a wheel or a shaft, of the actuator, interacts with an elastic element. When unwinding the pull cable, the biasing element is rotated in a first direction, for example, and the elastic element is elastically deformed. As a result of the restoring force of the elastic element, for example, the biasing element is rotated in a second direction and the pull cable is wound up, whereupon the elastic element is relaxed.

According to an embodiment of the invention, at least one brake is associated with the actuator. The actuator has a biasing element, for example. The biasing element can be braked by the brake, for example. According to an embodiment of the invention, the movement of the biasing element—e.g. a wheel, a rod or a shaft—can be braked by a first brake. In this case, the lid is not moved jerkily by the actuator when the elastically deformed element moves into the starting position as a result of its restoring force; instead the movement is braked.

The first or at least one additional brake interacts with the actuator, for example in at least one limited portion of the opening and/or the closing movement of the lid, in order to brake the movement of the lid. For example, the brake interacts with a biasing element only in one limited portion of the opening and/or the closing movement of the lid. Alternatively, the brake interacts with the biasing element in a plurality of limited portions of the opening and/or the closing movement of the lid.

According to an embodiment, the lid can be locked in the open and/or the closed position by a latch. The latch can, for example, comprise a so-called push-push mechanism which is locked for a movement of the lid in a first direction and is unlocked for a renewed movement of the lid in the first direction. The push-push mechanism is formed, for example, as a heart-shaped cam controller and is characterized in that a guide pin associated with the lid is guided by a heart-shaped cam on the base body.

An embodiment of the invention is characterized in that the lid is a roller shutter. A roller shutter has a multiplicity of interconnected slats, for example. Adjacent slats are connected to one another by a hinge, for example. The hinge can be a film hinge, for example. At least two hinge axes are formed parallel to one another. The roller shutter lid can be moved flexibly and can be moved between the open position and the closed position on a path with straight as well as with curved sections.

An embodiment is characterized in that the lid is guided by a guide assembly. For example, the guide assembly has at least one guide rail associated with the base body in which the lid is guided. A movement path for the lid can be formed cost effectively with one guide rail. The guide assembly has a guide slot, for example, in which at least one guide pin associated with the lid is guided. The lid can be provided on opposite sides with guide pins guided in slots of opposite guide rails of the base body.

The guide assembly can comprise at least one C-shaped guide, for example. For example, the guide assembly comprises two guides in parallel, wherein one side region of opposing side regions of the lid is in each case guided in a guide.

A container, characterized in that a first brake and a second brake are associated with the actuator, and that the first brake retards the biasing element during the whole movement of the lid, and the second brake retards movement of the lid in at least one limited portion.

A further embodiment is characterized in that the biasing element has a first coupling that engages with a second coupling of a brake in a certain position range of the biasing element.

BRIEF DESCRIPTION OF THE DRAWING

Further advantages can be seen from an embodiment shown in the Figure. Therein.

SPECIFIC DESCRIPTION OF THE INVENTION

A container as a whole is designated in the Figures at 10. The same references in the different figures designate corresponding parts, including when lowercase letters have been added or omitted.

Figure 1:
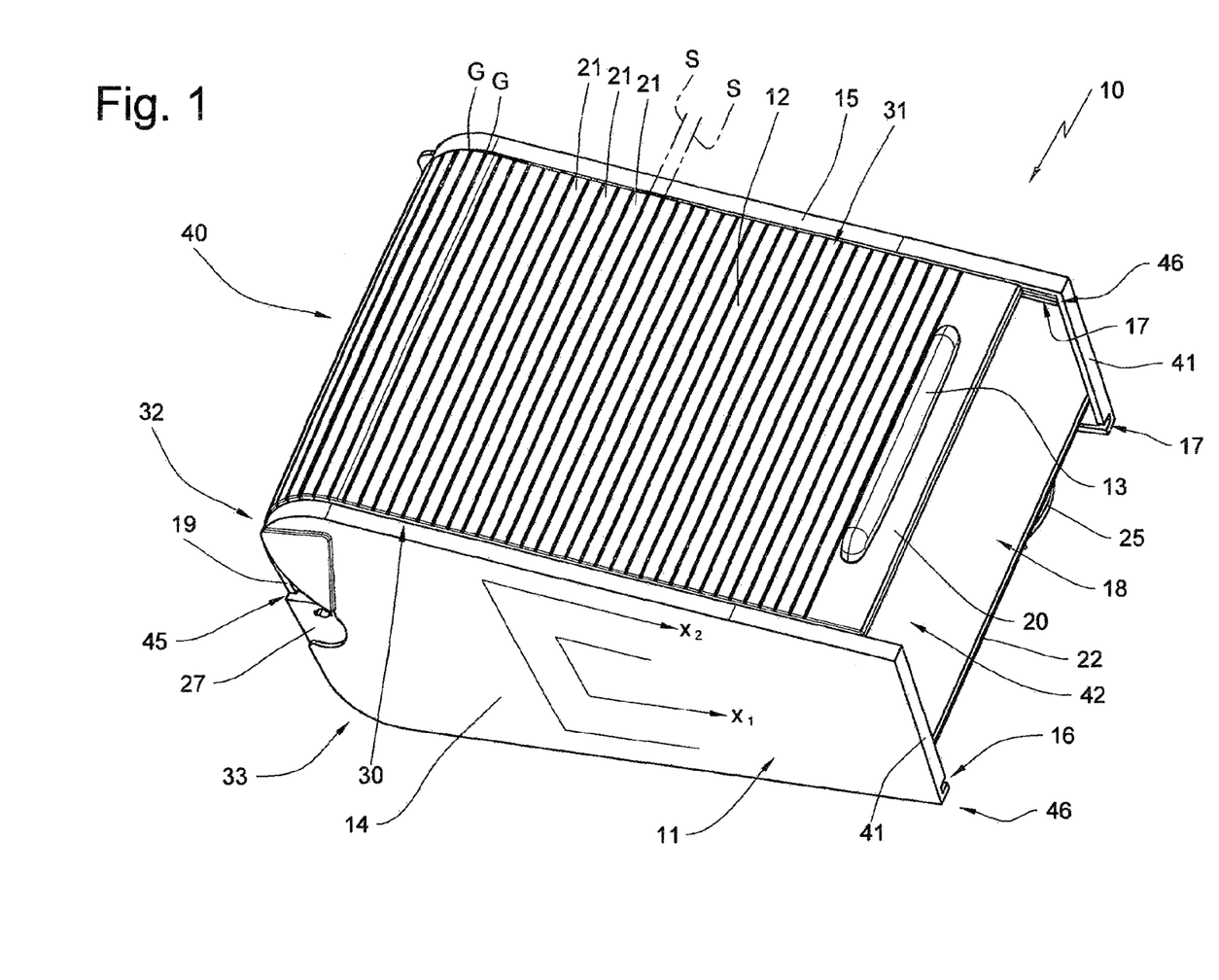
FIG. 1 is a perspective schematic top view of the compartment with the lid in the closed position.

The container 10 has a base body 11 forming a compartment 42 and a lid 12 for closing the compartment 42. The lid 12 can be moved out of the closed position shown in FIG. 1 into an open position according to FIG. 2. A handle 13, by means of which the user can move the lid 12 between the open and the closed position, is fixed to the lid 12.

The base body 11 has side walls 14 and 15. A guide 16 is formed in the side wall 14, and a guide 17 in the side wall 15, these guides together forming a guide assembly 46. The guides 16 and 17 are each formed by a slot. They serve to guide the lid 12 when it is moved between the open and the closed position. On an upper side, the guides 16 and 17 are closed by a strip 41. On the is lower side, the strip 41 has an opening.

The base body further has a rear wall 19 formed at a rear end 40 of the container 10. The compartment 42 is closed at a front side 18 of the container 10 by the center console. The side walls 14 and 15, the front wall 18 and the rear wall 19 delimit the compartment.

The lid 12 is a roller shutter and has a front end piece 20 and slats 21. Adjacent slats 21 are pivoted together by hinges G defining pivot axes S. The axes S and the hinges G are parallel to one another.

Figure 2:
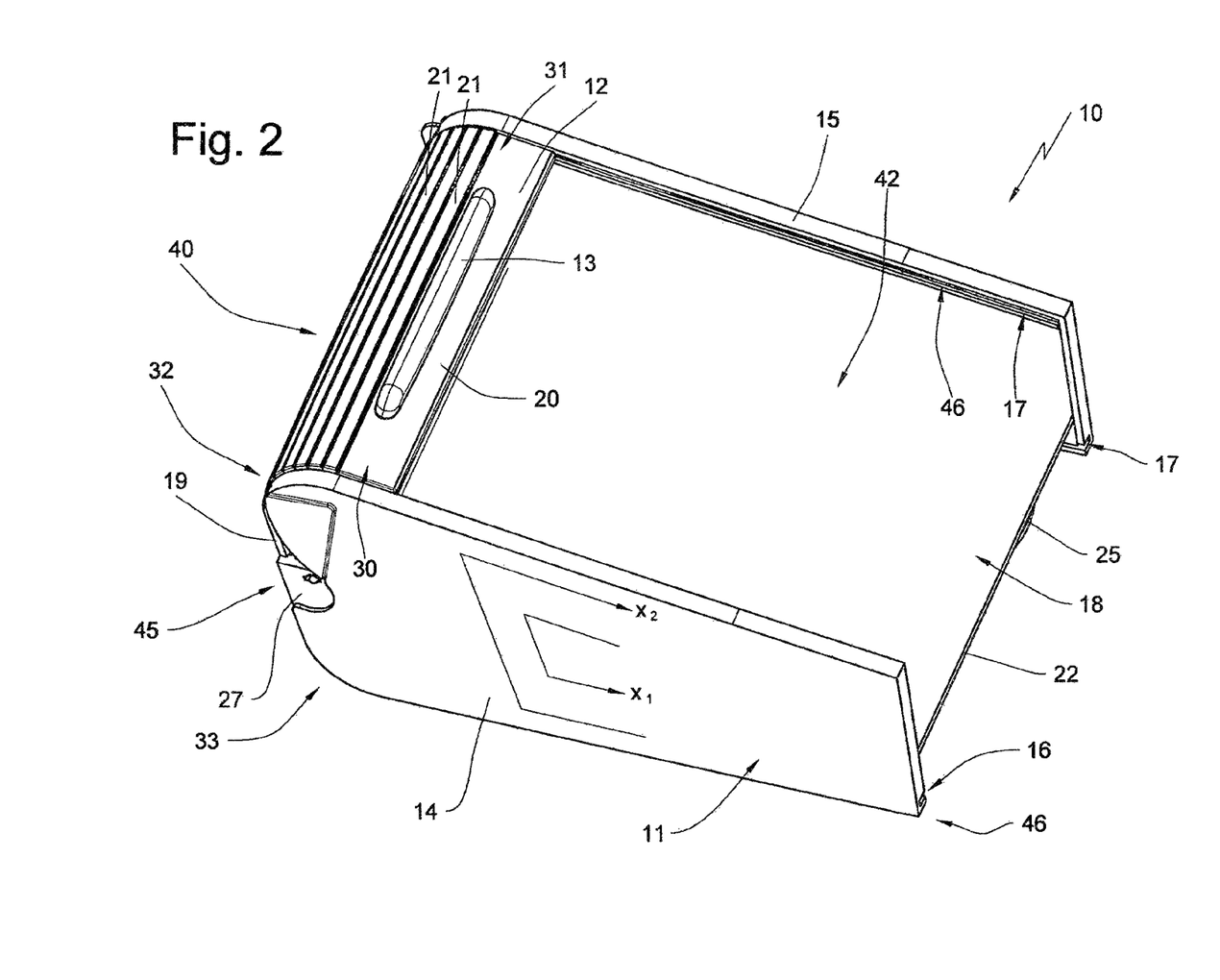
FIG. 2 is a perspective schematic view like FIG. 1 but with the lid in the open position.
Figure 3:
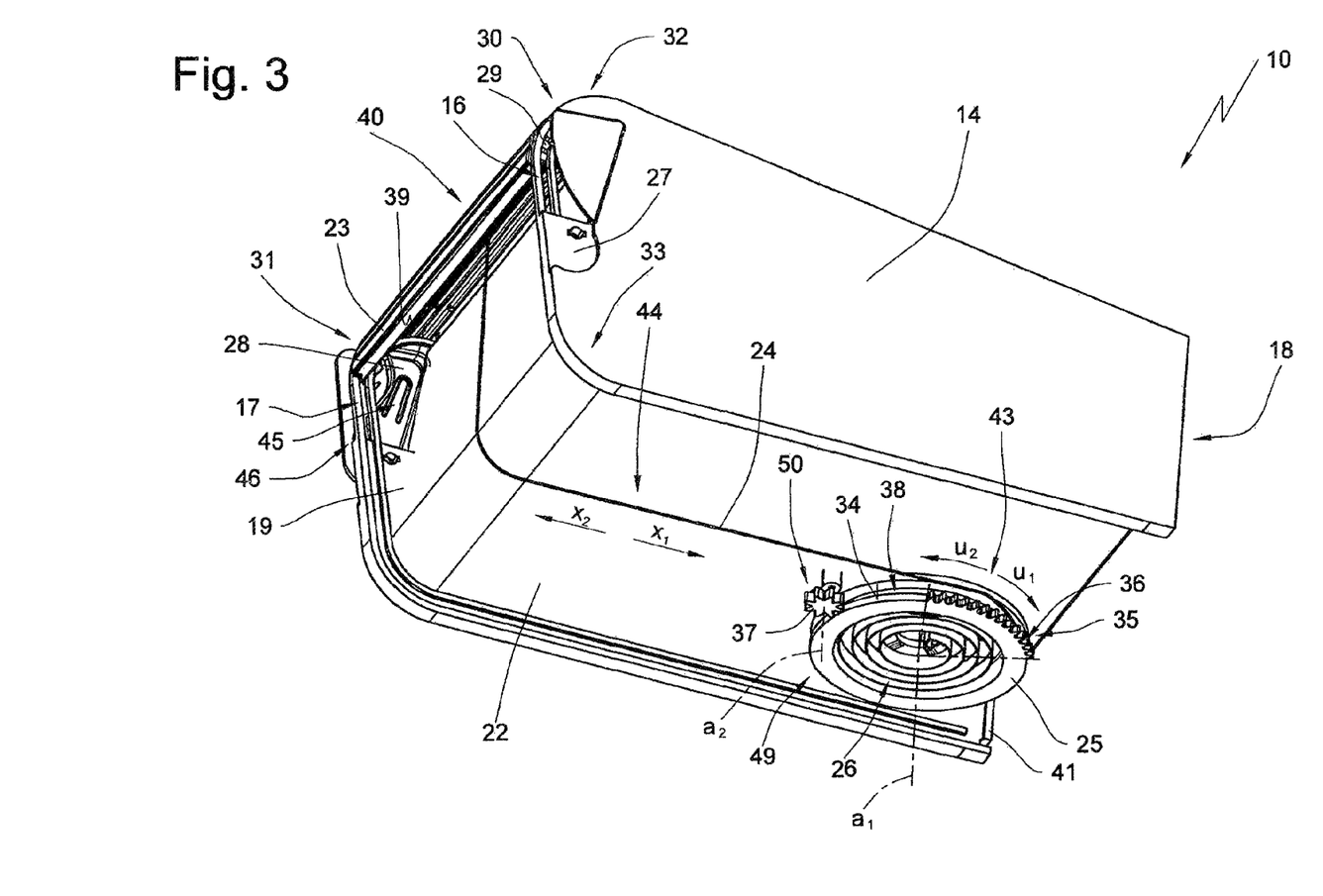
FIG. 3 is a perspective schematic bottom view of the compartment with the lid in the closed position.
Figure 4:
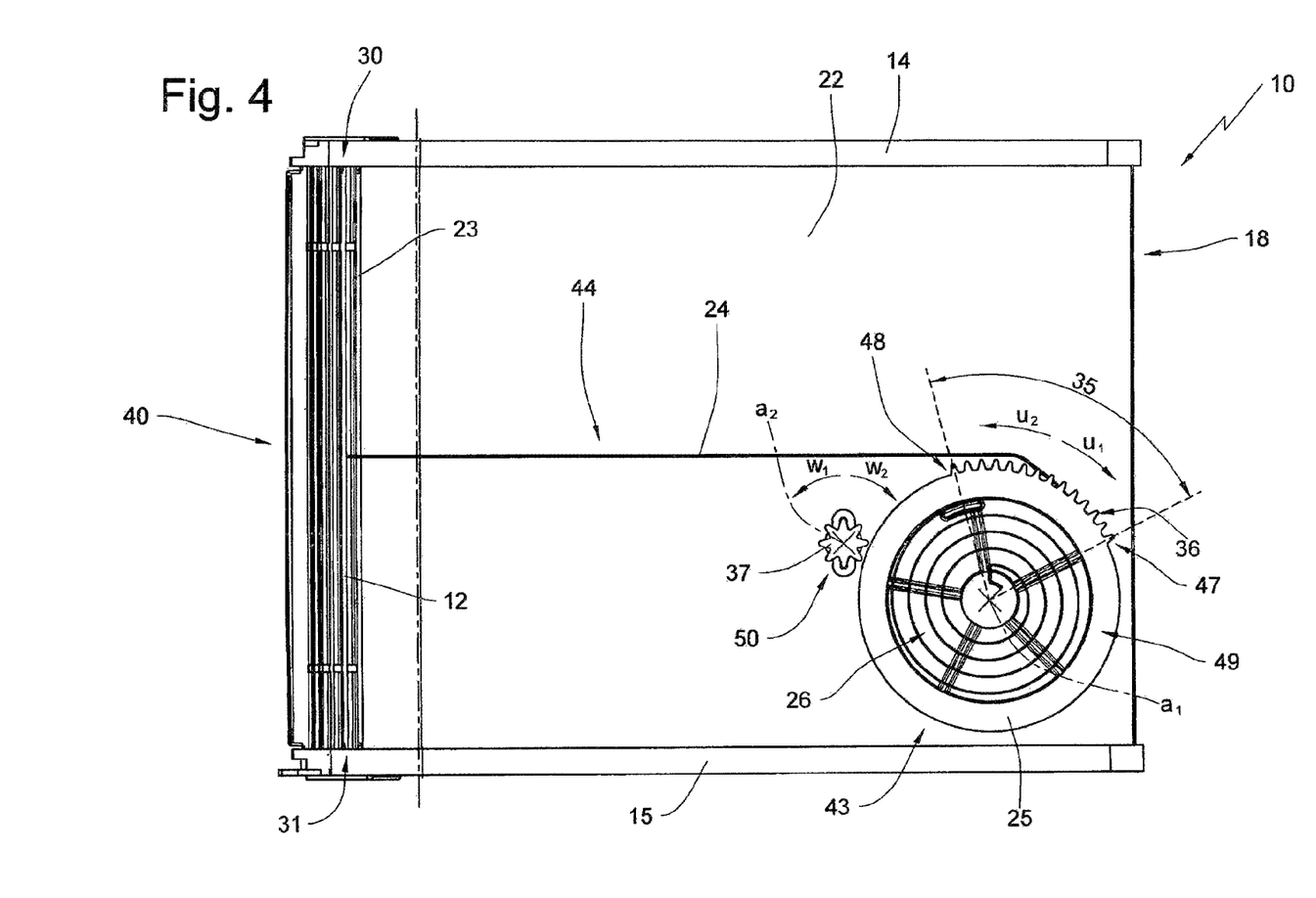
FIG. 4 is a schematic bottom view of the compartment, where a biasing element of the actuator is in a first position and the lid in the closed position.

A bottom wall 22 of the base body 11 can be seen in FIG. 2. A pull cable 24 is fixed to a rear end slat 23 of the lid 12. The pull cable 24 is part of a device 44 for transmitting force between the lid 12 and an actuator 43. The pull cable 24 is also fixed to a wheel 25 rotatable about an axis $a_1$ and biased in a direction of rotation $u_1$ by a spring 26. The movement of the wheel 25 is braked by a first brake 49 (not shown) formed by a viscosity brake. When the wheel 25 rotates in the direction of rotation $u_1$, the pull cable 24 is wound up in a slot 38 formed on a radial outer edge 34 of the wheel 25 and, in so doing, the free length of the pull cable 24 between the lid 12 and the wheel 25 is shortened. At the same time, the lid 12 is moved in a direction $x_1$ into the open position by the pull cable 24.

A structure 27 is fixed to the side wall 14 and a structure 28 to the side wall 15. The structures 27 and 28 are part of a latch 48, here a push-push mechanism. The push-push mechanism unlocks the lid 12 in the closed position by movement once in direction $x_2$ and locks the lid 12 in the closed position by movement a second time in the direction $x_2$.

FIG. 2 also shows that opposite sides 30, 31 of the lid 12 carry pins 29 engaged in the guides 16 and 17. Each guide 16 and 17 is formed approximately in a C-shape and has curved corners 32 and 33 in which they change direction by approximately 90°. In this way, when the lid 12 is opened, it is guided around the rear of the compartment until a substantial part of the lid is approximately parallel to the bottom wall 22 in a space-saving manner.

On its radial outer edge 34, the wheel 25 is provided with a row 36 of teeth forming a sector gear over a circular segment 35. A pinion 37 is rotatably mounted about an axis of rotation $a_2$. The pinion 37 is connected to an unillustrated second brake 50, here a viscosity brake. When the pinion 37 engages with the row 36 of teeth of the circular segment 35, the movement of the wheel 25 is retarded by the second brake 50.

The principle of operation of the container 10 is explained below. The lock is opened by moving the lid 12 in the direction $x_2$ by the handle 30. The wheel 25 can now rotate in the direction $u_1$ under the action of the spring 26, thereby winding the pull cable 24 up in the slot 38 up onto the wheel 25 and moving the lid 12 the in direction $x_1$ toward the open position. During movement between the closed and the open positions, the lid 12 slides in the C-shaped guides 16 and 17. During this movement, the wheel 25 is braked by the first brake 49.

Figure 5:
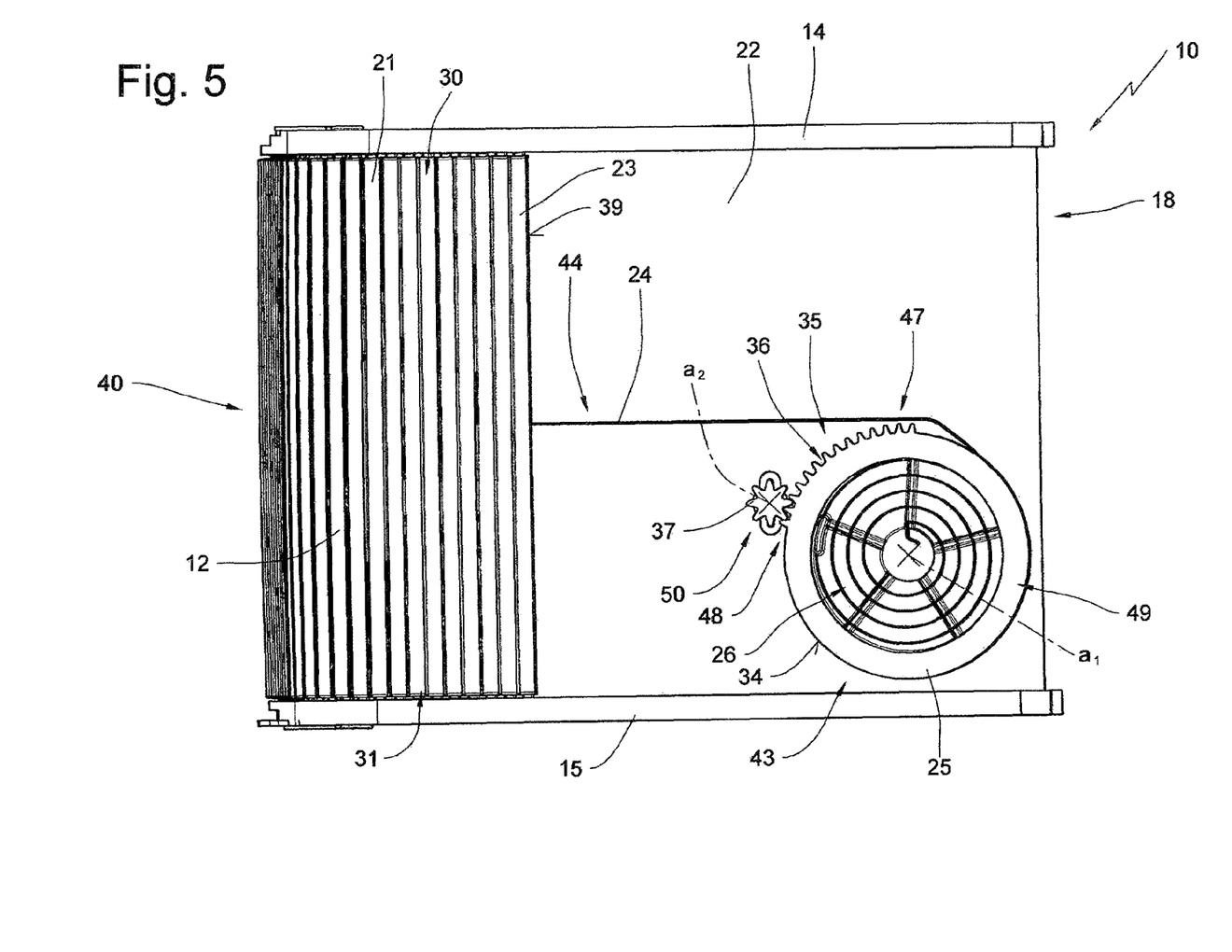
FIG. 5 is a schematic bottom view of the compartment according to FIG. 4, where a biasing element of the actuator is in a second position and the lid in the open position.
Figure 6:
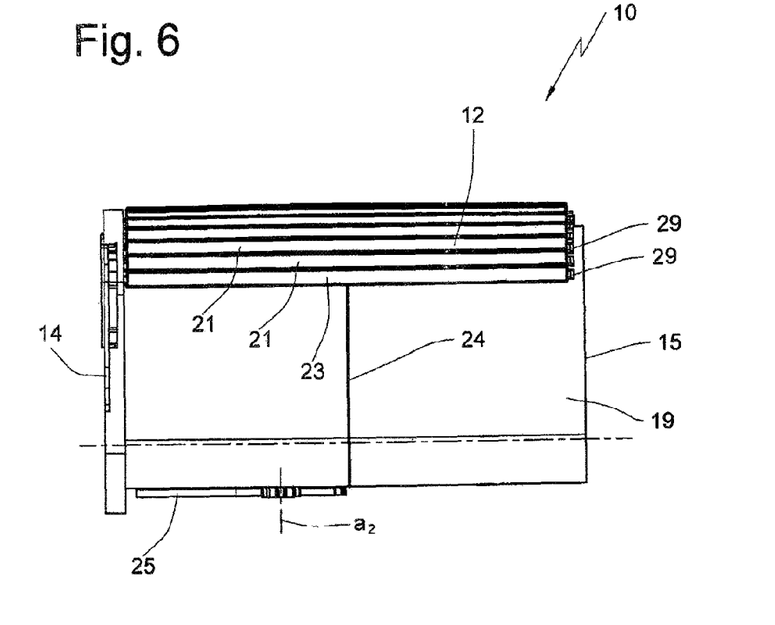
FIG. 6 is a schematic rear view of the compartment with the lid in the closed position.
Figure 7:
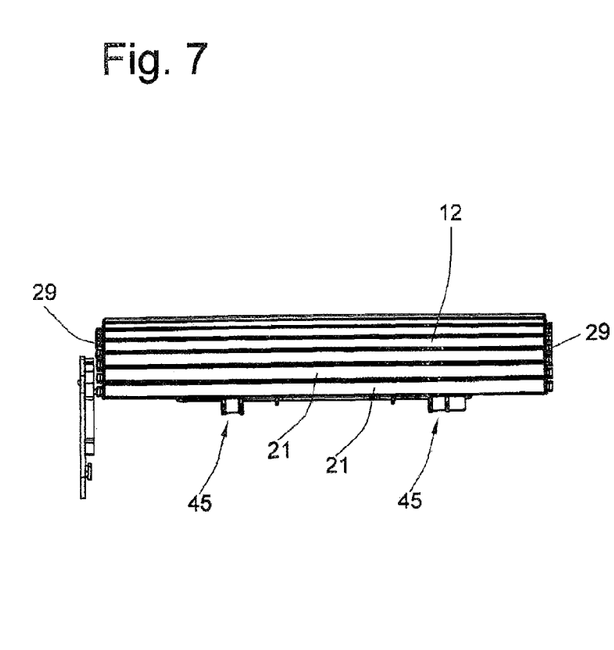
FIG. 7 is a schematic view of the roller shutter lid and the guides according to FIG. 6, a base body of the compartment not being shown.
Figure 8:
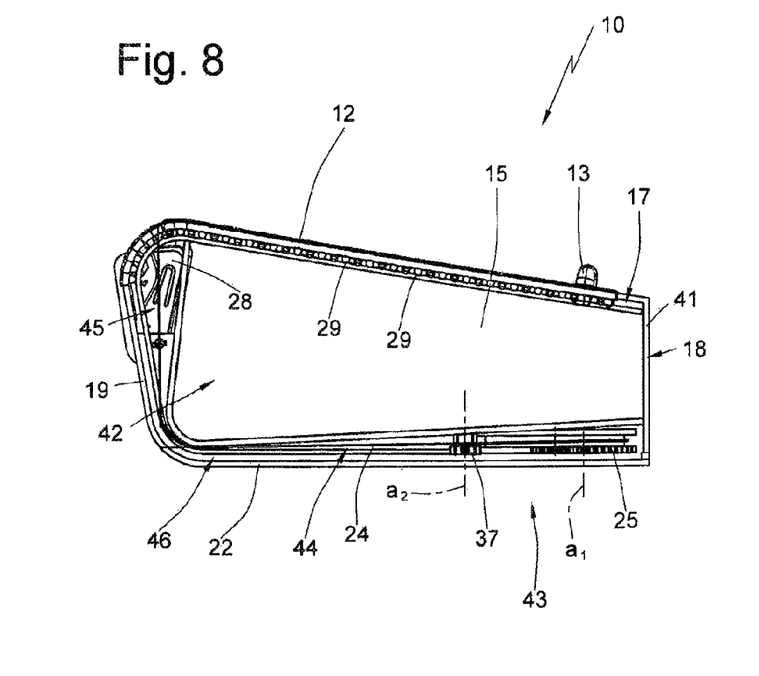
FIG. 8 is a schematic sectional view of the compartment with the lid in the closed position.
Figure 9:
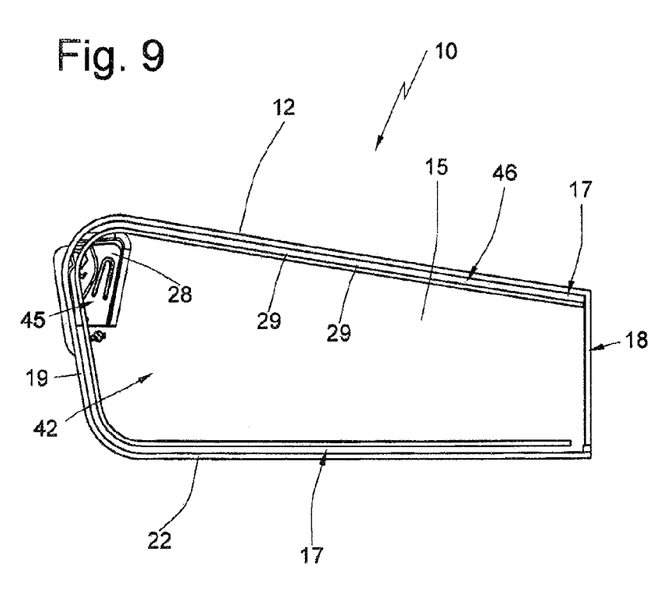
FIG. 9 is a schematic sectional view according to FIG. 8, where the roller shutter lid is not shown.

Shortly before reaching the open position, an end 47 of the row 36 of teeth engages with the pinion 37 of the second brake 50, thereby rotating the pinion 37 in a direction $w_1$. The second brake 50 retards further movement of the wheel 25, and therefore further movement of the lid 12 into the open position as shown for example in FIGS. 2 and 5. The lid 12 is in the open position, for example, when a stop formed on the wheel 25 comes into contact with a stop on the base body 11 or, alternatively, when, for example, a stop formed on the lid 12 comes into contact with a stop of the base body 11. In the open position of the lid 12, the pinion 37 is at an end 48 of the row1 36 of teeth.

During reverse movement of the lid from the open position into the closed position, the pull cable 24 is unwound from the wheel 25 against the restoring force of the spring 26 thereby rotating the wheel in a direction $u_2$ and tensioning the spring 26. The first brake 49 and the second brake 50 have no braking effect during movement of the lid 12 into the closed position, i.e. when the pinion 37 rotates in a direction $w_2$ and the wheel 25 in a direction $u_2$. The lid 12 can therefore be moved into the closed position with little resistance. The closed position (see, for example, FIG. 1, 3, 4, 6, 8) of the lid 12 is achieved when the end 23 of the lid 12 is locked by the push-push mechanism 48.

The invention claimed is:

1. A container for a vehicle interior and comprising:
    a base body in which at least one compartment is formed;
    a lid for at least partially closing the compartment and movable between a closed position and an open position;
    an actuator for biasing the lid into the open position or into the closed position;
    a first brake associated with the actuator and retarding movement of the lid during movement of the lid in at least one direction between the open and closed positions; and
    a second brake retarding movement of the lid in only at least one limited portion of movement in at least the one direction between the open and closed positions such that movement of the lid is slowed in the limited portion the lid relative to movement outside the limited portion.

2. The container as claimed in claim 1, wherein the actuator has at least one elastic element.

3. The container as claimed in claim 1 wherein the actuator has a force-transmitting element.

4. The container as claimed in claim 1, further comprising:
    a latch that can lock the lid in the open position or in the closed position.

5. The container as claimed in claim 1, wherein the lid is a roller shutter.

6. The container as claimed in claim 1, further comprising:
    a guide assembly on the base body supporting the lid.

7. The container as claimed in claim 3, further comprising:
    a biasing element connected to the actuator and to the lid by the force-transmitting element in such a way that a position of the biasing element is associated with each position of the lid.

8. The container as claimed in claim 7, wherein the biasing element has a first coupling that engages with a second coupling of the second brake in a certain position range of the biasing element.

9. A container for a vehicle interior and comprising:
    a base body forming a compartment;
    a lid movable on the base body through a movement range between a closed position closing the compartment and an open position giving access to the compartment;
    a rotatable actuator wheel on the base body connected to the lid and movable therewith on movement of the lid between the open and closed positions;
    means for biasing the actuator rotationally so as to urge the lid into one of the positions; and
    brake means effective on the actuator wheel for slowing movement of the wheel only in a limited portion of the movement range of the actuator wheel approaching and reaching the one position.

10. The container defined in claim 9 wherein the wheel is formed as part as a sector gear, the brake means including:
    a pinion meshing with the sector gear only in the limited portion of the movement range; and
    a brake retarding rotation of the pinion.

11. The container defined in claim 9 wherein the one position is the open position.

* * * * *